(12) United States Patent
Schöning et al.

(10) Patent No.: US 7,449,977 B2
(45) Date of Patent: Nov. 11, 2008

(54) CIRCUIT HAVING ISOLATED TRANSMITTING AND RECEIVING PATHS

(75) Inventors: Jens Schöning, Herrsching (DE); Peter Hagn, Finsing (DE)

(73) Assignee: EPCOS AG, Munich (DE)

( * ) Notice: Subject to any disclaimer, the term of this patent is extended or adjusted under 35 U.S.C. 154(b) by 298 days.

(21) Appl. No.: 11/211,131

(22) Filed: Aug. 24, 2005

(65) Prior Publication Data

US 2006/0073792 A1    Apr. 6, 2006

(30) Foreign Application Priority Data

Aug. 24, 2004    (DE)    ................ 10 2004 040 967

(51) Int. Cl.
*H01P 5/12*    (2006.01)
*H03H 7/38*    (2006.01)
*H03H 7/46*    (2006.01)

(52) U.S. Cl. .................. 333/134; 333/126; 333/129; 333/132

(58) Field of Classification Search .................. 333/126, 333/129, 132, 134
See application file for complete search history.

(56) References Cited

U.S. PATENT DOCUMENTS 6,633,748 B1 * 10/2003 Watanabe et al. ............. 455/78
7,250,829 B2 * 7/2007 Namura ....................... 333/104

* cited by examiner

*Primary Examiner*—Robert J. Pascal
*Assistant Examiner*—Kimberly E Glenn
(74) *Attorney, Agent, or Firm*—Fish & Richardson P.C.

(57) ABSTRACT

An electrical circuit includes an antenna connection for receiving a signal, a first signal path connected to the antenna connection, a filter arranged in the first signal path, and a first and a second gate circuit connected in series. The first gate circuit is connected to the antenna connection, and the second gate circuit is arranged between the first gate circuit and the filter. The first and second gate circuits each includes an impedance transformer arranged in the first signal path and a shunt circuit connected to ground. The shunt circuit includes a switch element and a capacitor. When the switch element is enabled, the shunt circuit defines a ground path through which at least part of the signal can pass to ground.

31 Claims, 7 Drawing Sheets

CIRCUIT HAVING ISOLATED TRANSMITTING AND RECEIVING PATHS

CLAIM TO PRIORITY

This patent application claims priority to German Patent Application No. 102004040967.6, filed on Aug. 24, 2004, the contents of which are hereby incorporated by reference into this application as if set forth herein in full.

TECHNICAL FIELD

This patent application is directed to an electrical circuit suitable for high frequency signal transmission that may be used in the front-end circuit of a mobile radio device.

BACKGROUND

Figure 1:
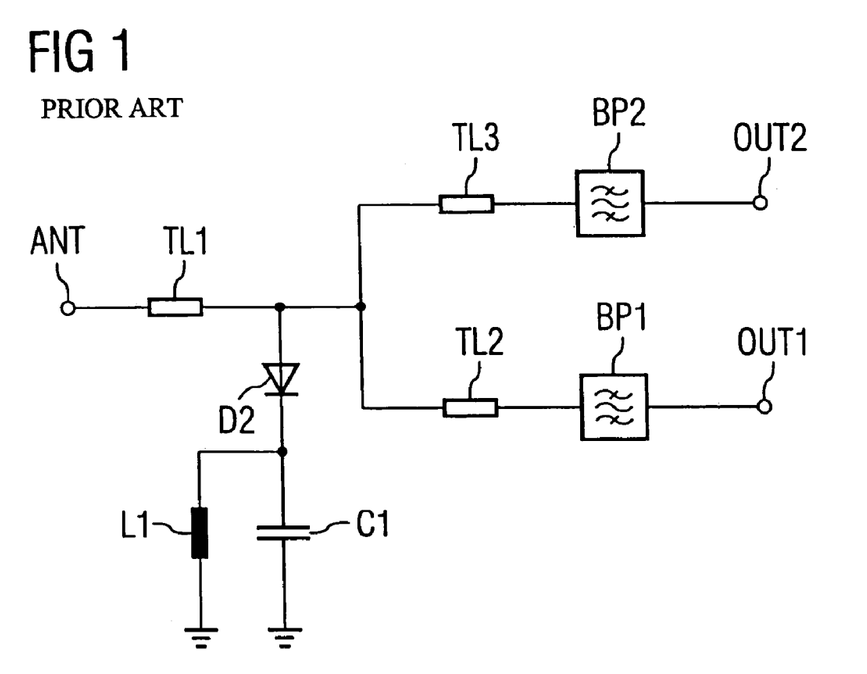
FIG. 1 shows a block diagram of a known circuit.

A front-end circuit in accordance with FIG. 1 is known. The circuit includes a receiver branch, which has several partial paths that are combined into a main path on the antenna side. Each of the partial paths constitutes a reception path of various radio systems and contains a bandpass filter BP1, BP2. In the transmission path, the input to these filters can be protected by a gate circuit, which is located in the main path. The gate circuit has a transmission line TL1, a diode D2, a capacitor C1 and an inductance L1. In the transmission path, the diode D2 is closed and provides a direct current path to ground, along with the inductance L1. The series connection of the inductance, diode D2 and capacitor C1 represents a short circuit for an HF signal (transmission signal), which represents an open end at the frequency of the transmission signal on the antenna-side (ANT) of the transmission line. In the partial paths, transmission lines TL2 and TL3 are connected ahead of bandpass filters BP1, BP2, respectively. OUT1 is the output of a first and OUT2 the output of a second partial path.

It was found that the foregoing circuit does not satisfy the requirements of telephone manufacturers regarding transmission/reception isolation in the specified restricted ranges or in the receiver ICs connected in back. With insufficient TX/RX isolation, low-noise amplifiers (LNA) located in the reception paths are overloaded, particularly in the transmission path. Therefore phase errors occur in signal transmission.

SUMMARY

In one aspect, the invention is directed to an electrical circuit for use in a front-end circuit of a mobile radio device having a high selectivity in restricted ranges.

The electrical circuit has a first signal path attached to an antenna gate, with a filter located therein and with several (at least two) gate circuits connected, one behind the other, between the antenna gate and the filter. Each of the gate circuits comprises at least an impedance transformer in the first signal path and a shunt to ground where a switch element of a switch and a capacitor are located. The switch element and the capacitor may be connected in series. The inherent inductance of the switch element and the capacitor constitute a series resonance loop having a low impedance at its resonant frequency. Therefore, upon enabling the switch element to pass an electrical HF signal of the appropriate frequency (which is to be suppressed), the shunt forms a short circuit between the first signal path and ground.

Strong suppression of the electrical signal in the restricted range of the first signal path occurs by means of a multi-step gate circuit. This circuit improves the linearity of the transmission characteristics of the first signal path and the isolation of the first signal path from other signal paths connected to the antenna gate.

In one aspect of the invention, an electrical circuit with a (first) signal path is disclosed, which has a branching site, with at least one gate circuit located in front of, and behind, the branching site. A filter, whose input is to be protected by the gate circuits, is located behind the branching site. Both gate circuits have at least one impedance transformer located in the signal path and a shunt to ground, in which a switch element (a semiconductor element, e.g., a diode, a GaAs FET or a micro-electromechanical switch) and a capacitor is located, such that, with the switch element enabled for passage of an electrical signal (in particular the HF signal), the shunt forms an absorber circuit to ground. The respective shunt may be connected behind the impedance transformer. With the switch element being enabled, the shunt may also constitute an absorber circuit for a direct current signal (e.g., a control voltage).

The gate circuit located in front of the branching point, i.e., on the input side, is called the first gate circuit in the following. The gate circuit located behind the branching point, i.e., on the output side, is called the second gate circuit in the following.

Because the gate circuits are constructed as two stages, this aspect of the invention has a particularly high selectivity in a restricted range of the partial path in which the second gate circuit is located.

The electrical circuit may be used as a receiver branch of a front-end circuit of a radio transmission device that is capable of transmitting in several frequency bands. The first signal path may be used a reception path, which may be employed in the main path, i.e., on the antenna side before the branching point, by several radio systems (e.g., GSM 1800, GSM 1900), and in partial paths, i.e., on the output side behind the branching point, by just one radio system. The center frequencies of the radio systems for which the electrical circuit is designed may differ by a factor of 1<x<2.

In an implementation of the invention, the diode located in the cross branch is electrically connected to a control voltage source via an inductance and/or a resistor. In an alternative implementation, a further shunt with an inductance connected to ground can be used in addition to the first shunt. In this case, the first shunt is used for controlling the diode by means of an (external) control voltage.

The inductance of the closed diode (through which current passes), together with the capacitor connected with it in series, represents an HF short-circuit to ground at the resonant frequency, whereby the input of the filter located in the partial path or of a low-noise amplifier connected behind it is grounded and is thus protected (in particular, in the transmission case, against high power).

The impedance transformer may be implemented via a transmission line. The transmission line may have a length of essentially λ/4, where λ is the wavelength corresponding to a transmitter frequency that is to be transmitted over a second signal path. Other impedance transformers or phase shifters can alternatively be used, which may produce an angular phase shift of the HF signal (at the transmitter frequency) by 180°. LC members, e.g., a π-member, can in principle be used as a phase shifter.

The circuit can be used with one radio band or several radio bands. In this context, a radio band is a transmission and a reception band of a radio system.

In an advantageous aspect of the invention, a second signal path is provided. It is possible to use the second signal path for another purpose, e.g., as a reception and data transmission path associated with a further radio or data transmission system (UMTS, WLAN=Wireless Local Area Network).

A first control voltage applied to the diode in the first gate circuit or in a first direct current control path (in the second HF signal path) is only applied during transmission of the signal at a frequency which is to be suppressed. A first or a second control voltage applied to the diode in the second gate circuit and/or in a second direct current control path is applied only during transmission of the signal to be suppressed in the first HF signal path (or in the corresponding partial path). In the corresponding control path, the current flows to ground, resulting in a DC short circuit of the first HF signal path to ground.

The circuit can also contain several first signal paths having the components described above. Various first signal paths are individually assigned as reception paths for a group of radio bands. Such radio bands may be combined into a group whose center frequencies differ by at most a factor of 1.9. If the center frequencies of two radio bands differ by an octave or more, they are assigned to different groups.

A shared transmission path may be associated with each group of several radio bands, which has the advantage of a low space requirement. Each radio band can alternatively be associated with its own second signal path.

The circuit can be implemented using discrete circuit components (coils, capacitors, resistors, diodes, filter chips) or on a circuit board. A discrete component may be a separately housed element with external connections suitable for surface mounting.

Some of the discrete or "naked" (i.e., non-housed) circuit components can alternatively be placed on a support substrate, wherein an electrical module formed in this manner may be surface mountable. The discrete components located on the top of the module can be open. The circuit components located on the top of the module, in particular the "naked" components—possibly together with discrete components—can be housed together, e.g., in a cap and/or a potted covering.

The "naked" components are, e.g., applied to the support substrate via a naked chip assembly. An electrical connection between the "naked" component and the support substrate can be made by means of flip chip technology or by wire bonding.

The support substrate may be configured as a multi-layer substrate with several dielectric layers and metallized layers between the dielectric layers. Structured metallized layered can form circuit components (in particular, inductances, capacitors, line structures). The integrated circuit components may be completely integrated in the substrate. The support substrate, which is, e.g., made of ceramic or laminates, is particularly suitable for integrating passive components (inductances, capacities, line sections) of the two impedance transformers or gate circuits.

Suitable filters are, e.g., microwave ceramic filters, filters operating with acoustic surface or bulk waves, strip line filters or inductive/capacitive (LC) filters. The LC filters may be implemented as surface-mountable LC chips. The LC filters can also be integrated within the substrate. It is possible for several filters—in particular filters operating with acoustic surfaces waves—to be configured together in a housed element or on a "naked" chip.

In one aspect, the housed chips are surface wave filters (i.e., the bandpass filters in the first signal path), which are located on the top side of a multi-layer ceramic substrate. The impedance transformers are then configured as, e.g., 50 ohm lines of length $\lambda/4$ concealed within the ceramic substrate or as LC members. The LC members can, e.g., be designed as printed circuits or conductive surfaces, which may be concealed in the substrate.

All inductances may be integrated or concealed in the ceramic substrate. The capacitors associated with the gate circuits also may be concealed in the ceramic substrate. The concealed components are configured as printed circuits in structured metallized layers of the substrate. The separation capacitor for isolating DC control paths may be a discrete element. The resistors in the direct current control paths and all diodes may be assembled at the top of the ceramic substrate.

In principle, components of the circuit can be integrated in a support substrate or they can remain exposed on its surface. The substrate contains connecting lines and vertical electrical connections—plated-through holes—for use in connecting concealed components to one another or an external circuit.

The components of a modularly constructed element in this circuit can, in principle, be implemented using different technologies, e.g., the bandpass filters may be implemented by flip chip or bonded wire technology, e.g., "naked" surface wave filters; the lowpass filter may be implemented by strip line technology; the resistors may be implemented as separate layer structures; and the diodes may be implemented as surfaces mountable housed components.

In the following, the invention is described in greater detail based on representative embodiments and the corresponding figures. The figures show various example embodiments of this invention by means of schematic, not true to scale representations. Identical or similarly operating parts are shown with identical reference symbols.

The details of one or more examples are set forth in the accompanying drawings and the description below. Further features, aspects, and advantages of the invention will become apparent from the description, the drawings, and the claims.

DESCRIPTION OF THE DRAWINGS

Like reference numerals in different Figs. indicate like elements.

DETAILED DESCRIPTION

FIG. 1 shows a block diagram of a known circuit, which is applicable as the reception branch of a dual band device. The main path contains a switch element of an active switch. Each of the partial paths contains a transmission line TL2, TL3, i.e., a passive adaptive network, in front of the filter input. The adaptive network, in particular, ensures the establishment of strong signal damping in specified restricted ranges. In this case, the partial paths contain no nonlinear or active switch elements to further improve signal attenuation in restricted ranges.

Figure 2:
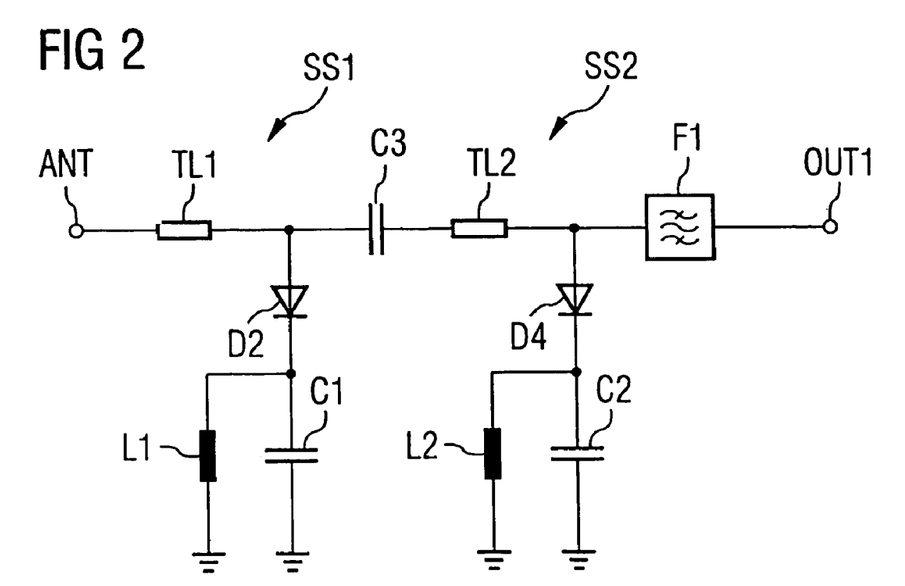
FIGS. 2 to 4 show block diagrams of a circuit having isolated paths.

FIG. 2 shows a general embodiment of a circuit having isolated transmission and reception paths. A filter F1 is located in a first signal path, which is connected to output OUT1 on the output side and to an antenna gate ANT on the input side. Between the antenna gate ANT and filter F1, there is a two-stage gate circuit which contains a first and a second gate circuit SS1 and SS2. In this example, a separation capacitor C3 is connected between the first and the second gate circuit SS1 and SS2.

The first and the second gate circuits each contain a transmission line TL1, TL2 (impedance transformer) in the signal path and the following elements in a shunt: a diode D2, D4 (switch element), an inductance L1, L2 connected to ground and a capacitor C1, C2 connected to ground. Closed (i.e., conductively-biased) diode D2 and inductance L1 (or diode D4 and inductance L2) together constitute an absorber circuit for low-frequency signals, in particular for a direct current, which flows through the diode when a control voltage is applied, i.e., a DC short circuit to ground is produced with closed diode D2, D4. Closed diode D2 and capacitor C1 (or diode D4 and capacitor C2) together constitute an absorber circuit for high frequency signals, i.e., an HF short circuit to ground is produced via closed diode D2, D4.

The gate circuit protects the filters in the first signal path (reception path) and subsequent signal processing steps, in particular the low-noise amplifier not shown in this drawing, from overloading (and/or generally against coupling the transmission signal back into the high frequency signal processing IC) in the transmission of a signal which is to be damped in the first signal path, particularly in case of transmission in a second signal path (transmission path). The first and the second signal paths are both connected to the antenna gate ANT, e.g., via an antenna switch S1 (see FIG. 5), and run parallel to each other. Phase errors can be reduced significantly in subsequent stages.

This circuitry described herein can be employed in a multi-band mobile radio device with a 1 GHz send/receive path and a 2 GHz send/receive path. A 2 GHz signal path is also understood to include partial paths running parallel to each other (receiving paths RX1, RX2), which are, e.g., associated with the radio bands near 1800 MHz and 1900 MHz. The multi-band device can also have other signal paths, e.g., for transmitting UMTS signals.

Figure 3:
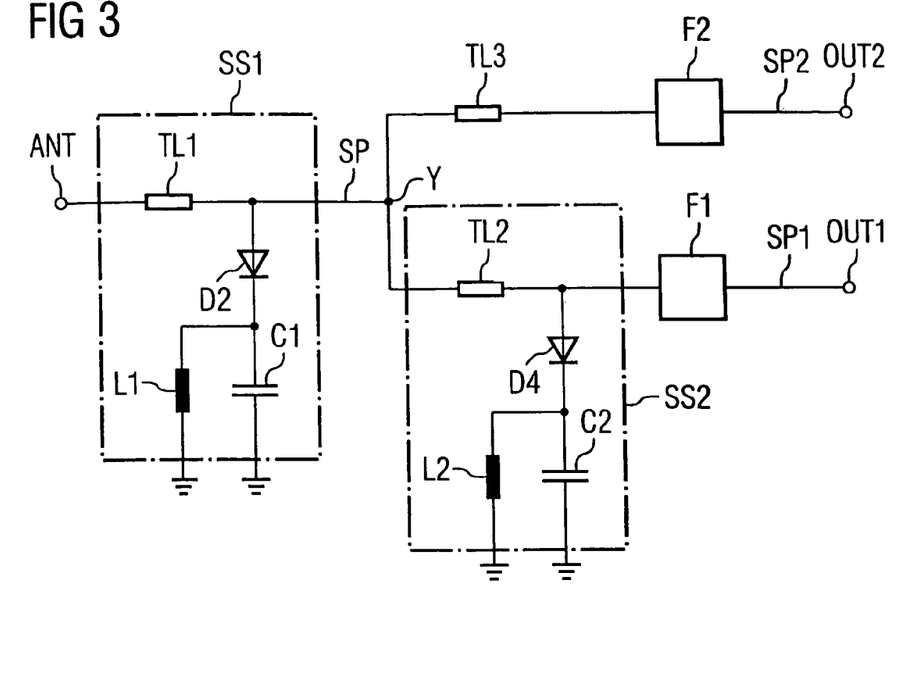

FIG. 3 shows the block diagram of another embodiment of the invention. The circuit represents a 2 GHz reception branch of a multi-band mobile radio circuit. Between an antenna gate ANT and the electrical gates OUT1, OUT2, this circuit includes a signal path, which contains a main path SP on the antenna side (on the input side) and which branches into several partial paths SP1, SP2, on the output side. The first partial path SP1 is connected to the output OUT1 and the second partial path SP2 to the output OUT2.

Each partial path SP1, SP2 contains a filter F1, F2. The main path contains a first gate circuit SS1 in a first partial path SP1 and a second gate circuit SS2. The second partial path SP2 contains a transmission line TL3.

The impedance transformer in the main path is located between the antenna gate ANT and the branch point Y of the first signal path. The impedance transformer located in the corresponding partial path SP1 is situated between the branch point Y of the first signal path and the filter F1.

The transmission line may have a length of λ/4. The impedance transformer can alternatively be constructed as a transmission line that includes inductances and capacitors, and may represent a phase shifter that performs an angular phase shift of a signal of 180° at the given frequency (e.g., the transmitter frequency). At this frequency, the HF short-circuit one end of the phase shifter is converted to an "open end" at its opposite (input side) end. In the transmission case, the input to the filter F1, F2 is protected in this manner.

Figure 4:
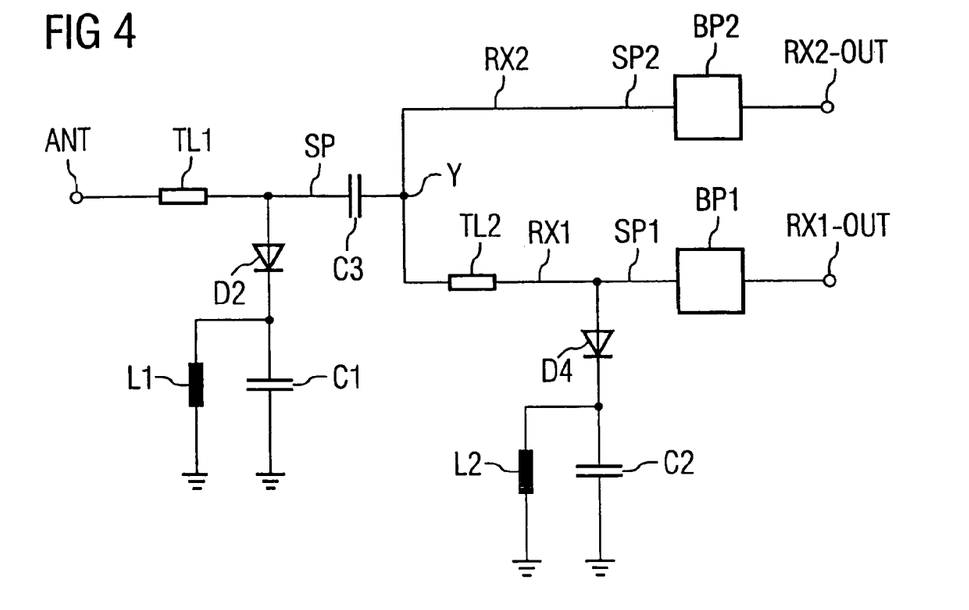

In FIG. 4, the first partial path SP1 may be configured as the reception path associated with the mobile radio system GSM-1800 with the output RX1-OUT. The second partial path SP2 may be configured as the reception path associated with mobile radio system GSM-1900 with the output RX2-OUT. Bandpass filters BP1, BP2 generally correspond to the filters F1, F2.

In the case of transmission of GSM-1900 in a multi-band mobile radio device operable in GSM-1800/1900 mode, isolation between the GSM-1900 transmission (operating at 1850-1910 MHz) against the GSM-1800 reception path (operating at 1805-1880 MHz one) is particularly important because of band overlap.

In FIG. 3, a transmission line TL2, TL3 is located in the first partial path SP1 as well as in the second one SP2. In contrast, the circuit of FIG. 4 has no transmission line in the second partial path SP2. In one embodiment, the second partial path SP2 can also contain a gate circuit with a nonlinear circuit element, which is shown schematically in FIG. 5 (switches S3 and S4).

Figure 5:
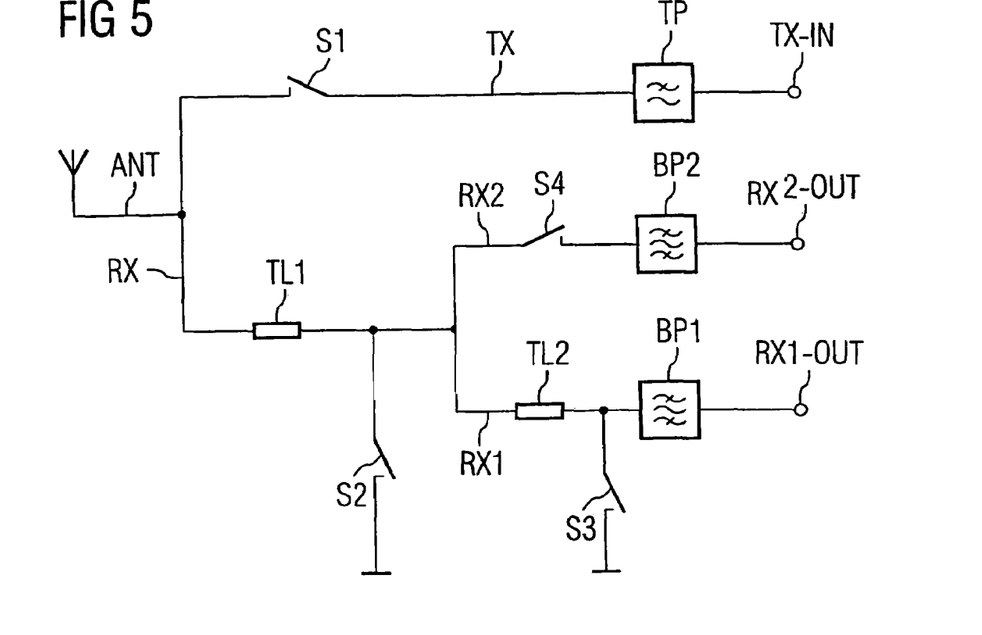
FIG. 5 shows the block diagram of a circuit with a second signal path and an antenna switch.
Figure 6:
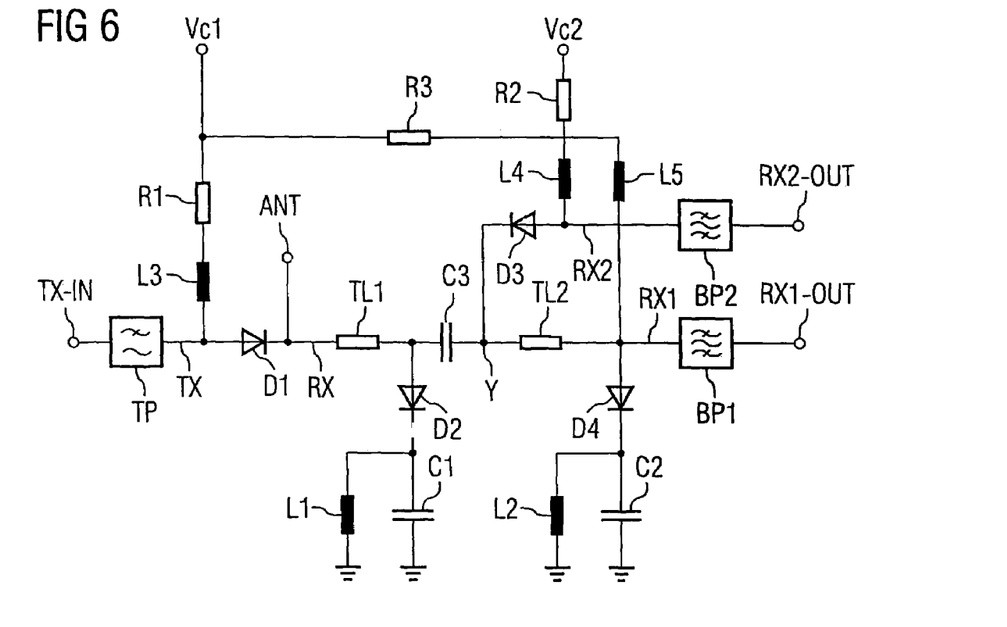
FIGS. 6 to 10 show diagrams of a circuit with control paths.
Figure 7:
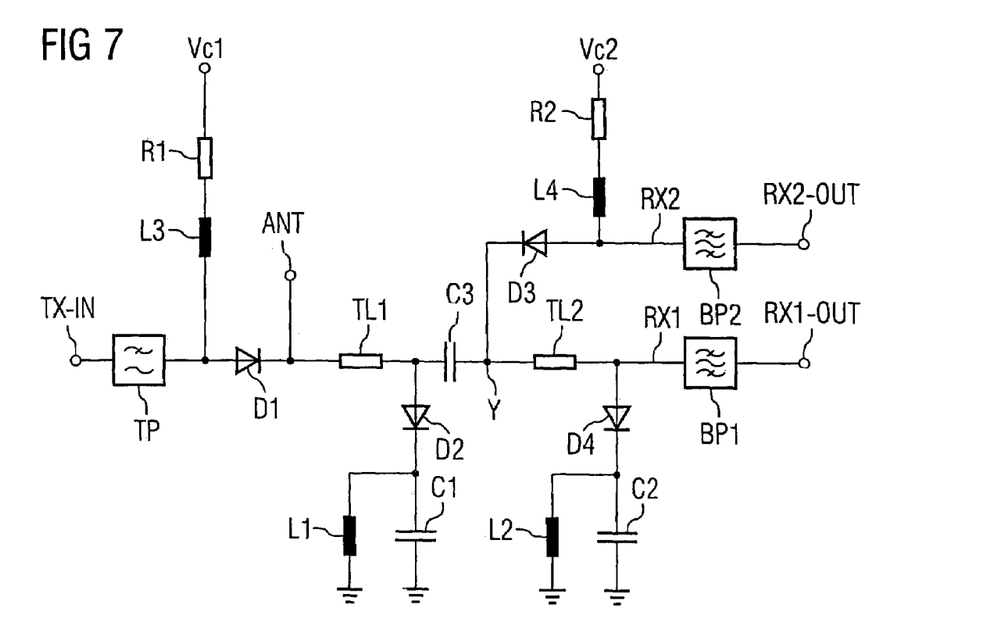

In the embodiment of FIG. 5, there is an antenna switch (antenna switch=switch element S1 in combination with switch element S2), which switches between a reception path RX (=first signal path) and a transmission path TX (=second signal path) and which connects then in turn with the antenna gate ANT. The transmission path TX contains a lowpass filter TP. A representative embodiment of this circuit is shown in FIGS. 6, 7.

The shunt of the reception path RX has a switch S2 in front of the branching point Y, which switch comprises the diode D2 in accordance with FIGS. 3, 4, 6 to 10. The switch S3 comprises the diode D4 in accordance with FIGS. 3, 4, 6 to 10. The switch S4 comprises the diode D3, see FIGS. 6, 7. In one implementation (FIGS. 6, 7), the switches S3 and S4 are switched simultaneously.

Figure 5A:
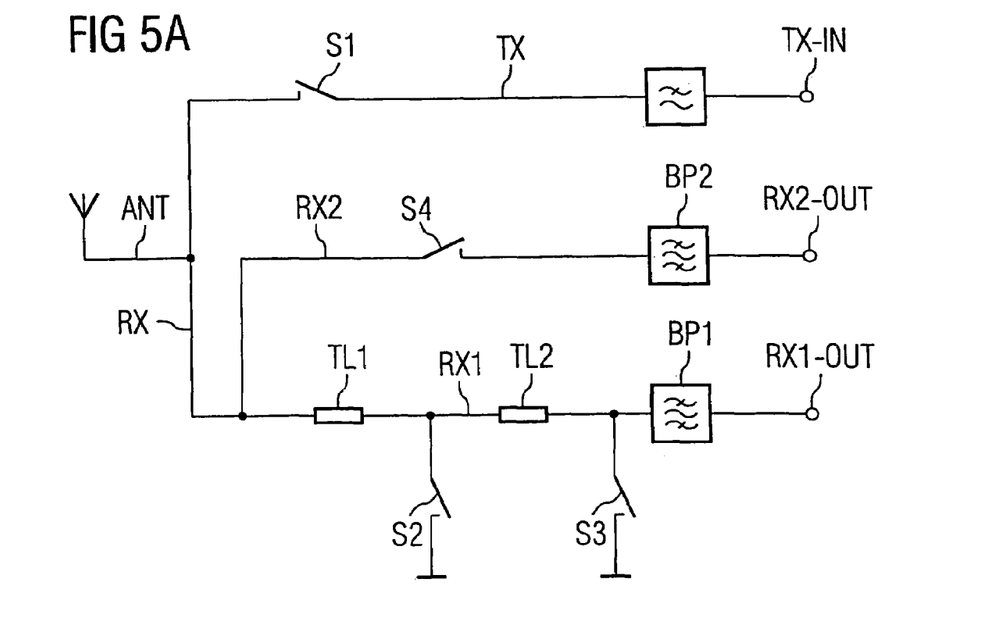
FIG. 5A shows the circuit of FIG. 5 with a possible circuit variant for accommodating a second partial reception path.

FIG. 5A shows a variant of the circuit of FIG. 5, in which both transmission lines TL1 and TL2 are located in the first partial receiving path RX1. Switch S4 is located in a second partial reception path RX2. First transmission line TL1 and switch S2 together constitute a first circuit stage. The second transmission line TL2 and switch S3 together constitute a second circuit stage.

Each of FIGS. 6 to 10 shows a diagram of a circuit with control paths. In these examples, the inputs of the bandpass filters BP1, BP2 and the output of the lowpass filter TP may have no direct current path to ground.

Furthermore, an example activation of the switches S2, S3 and S4 is described. During transmission of the first transmission signal (e.g. TX-1900 MHz) via the transmission path TX, switches S2, S3 and S4 are enabled. During transmission of the second transmission signal (e.g. TX-1800 MHz) via the transmission path TX, the switches S3 and S4 can also be disabled (no band overlap). During transmission of the received signal via the reception path RX1, the switches S2, S3 and S4 are open, i.e. disabled.

During transmission of the received signal via the reception path RX2, the switch S2 is open (disabled), while the switches S3 and S4 are closed (enabled). Thus, an open end is produced in the reception path RX1 on the input side. The reception path RX1 is therefore closed. The HF signal is, in this case, directed into the reception path RX2.

FIG. 6 shows a first and a second control input to each of which a first and/or a second control voltage Vc1, Vc2 is applied. The control voltages are in the restricted range of the first signal path—in this case, reception path RX—, e.g., in the pass band of the second signal path—in this case, transmission path TX.

A first control path (=DC current path) between first control input Vc1 and ground connection provides diodes D1 and D2 with current and is separated from other control paths via separation capacitor C3. The first control path includes resistor R1, inductance L3, the diode D1, first transmission line TL1, diode D2, and the inductance L1.

A second control path between second control input Vc2 and ground supplies current to diodes D3 and D4. The second control path includes resistor R2, inductance L4, diode D3, second transmission line TL2, diode D4, and inductance L2.

The first control path is of identical design in FIGS. 6 to 10.

Another control path located between the first control inlet and the ground connection, which serves the purpose of providing current to diode D4, is shown in FIG. 6. This control path includes resistor R3, inductance L5, diode D4, and inductance L2. This control path and the second control path have shared circuit elements D4, L2 or they are connected together to ground.

The two control voltages Vc1, Vc2 may be applied simultaneously (in the transmission case, via transmission path TX). It is also possible for each control voltage Vc1, Vc2 to be assigned to its own operation (for example the different transmitter frequencies) and to be applied at different times.

The activation of diodes in the circuit of FIG. 6 can take place as follows.

Control voltage Vc1 is applied to transmit the transmission signal via transmission path TX, with diodes D1, D2 and D4 being closed. Diode D3 is disabled in this case.

No control voltage is applied to transmit the received signal via reception path RX1; all diode switches D1 to D4 are open (disabled) in this case.

Control voltage Vc2 is applied to transmit the received signal via reception path RX2. Diodes D3 and D4 are closed (enabled), but diodes D1 and D2 are open (disabled). An open end for the HF signal is thus produced on the input side of reception path RX1. Reception path RX1 is therefore closed (disabled). The HF signal is, in this case, directed into reception path RX2.

The activation of the diodes in accordance with FIG. 6 has the advantage that, in the transmission case, the diodes (D2 and D4) in both gate circuits pass current simultaneously via a shared control voltage.

In another implementation shown in FIG. 7, it is possible to forego a double supply of current to diode D4. In FIG. 7 diode D4 is only supplied with current "singly" via the second control path.

The activation of the diodes in the circuit of FIG. 7 can take place as follows.

In transmitting the transmission signal via transmission path TX, control voltage Vc1 as well as control voltage Vc2 is applied, whereby diodes D1 to D4 are closed (enabled).

In transmitting the received signal via reception path RX1, no control voltage is applied. All diode switches D1 to D4 are open (disabled) in this case.

In transmitting the received signal via reception path RX2, only the control voltage Vc2 is applied. Diodes D3 and D4 are closed (enabled), but diodes D1 and D2 are open (disabled). An open end for the HF signal is thus produced on the input side of reception path RX1. Reception path RX1 is therefore closed (disabled). The HF signal is directed into reception path RX2.

When diode D1 is open (disabled), transmission path TX is separated from the antenna gate ANT, see FIGS. 6, 7. When diode D1 is closed, the transmitted signal (e.g., of a radio system GSM-1800/1900) can arrive at the antenna gate via the lowpass filter TP. The closed diode D2 along with capacitor C1 constitutes an HF short-circuit, which is transformed to a no-load circuit via line TL1. The transmitting power in the reception path is suppressed. In the same operation, another DC current additionally flows to ground via the second control path (R3, L5, D4 and L2). The closed diode D4, along with capacitor C2, constitutes an HF short-circuit, which is transformed to a no-load circuit via line TL2. The transmission signal, which is already suppressed by the first gate circuit (D2, C1, TL1), is thus further suppressed by the second gate circuit (D4, C2, TL2) before it arrives at the input of the filter BP1 or at the output RX1-OUT of the first partial path. Strong isolation is particularly important with a band overlap in the second signal path (in this case, the transmission path GSM-1900) and in the corresponding partial path (in this case, the reception path GSM-1800) of the first signal path.

The gate circuits in the different partial paths can, in principle, be switched via a common control voltage—e.g. Vc2 for the diodes D3 and D4 in FIGS. 6, 7—or via mutually independent control voltages. The input to filter BP1 is then always grounded when the switch element is closed (enabled) via a control signal.

The placement of diode D3 in the second partial reception path is particularly space-saving and advantageous for signal absorption in the restricted range of the second partial path, since this partial path is closed (disabled) in the transmission case—even without its own absorber circuit.

Figure 8:
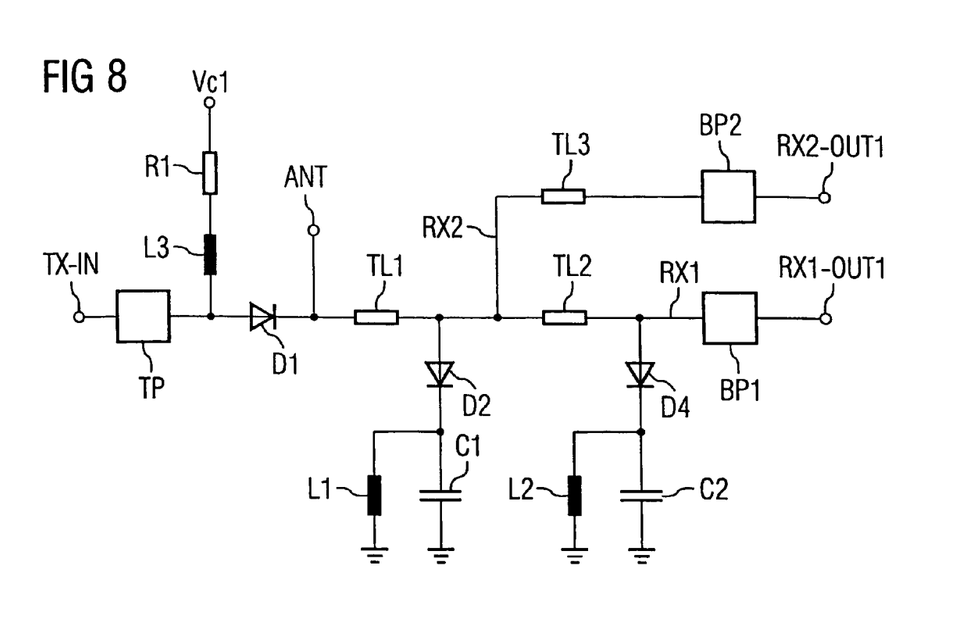
Figure 9:
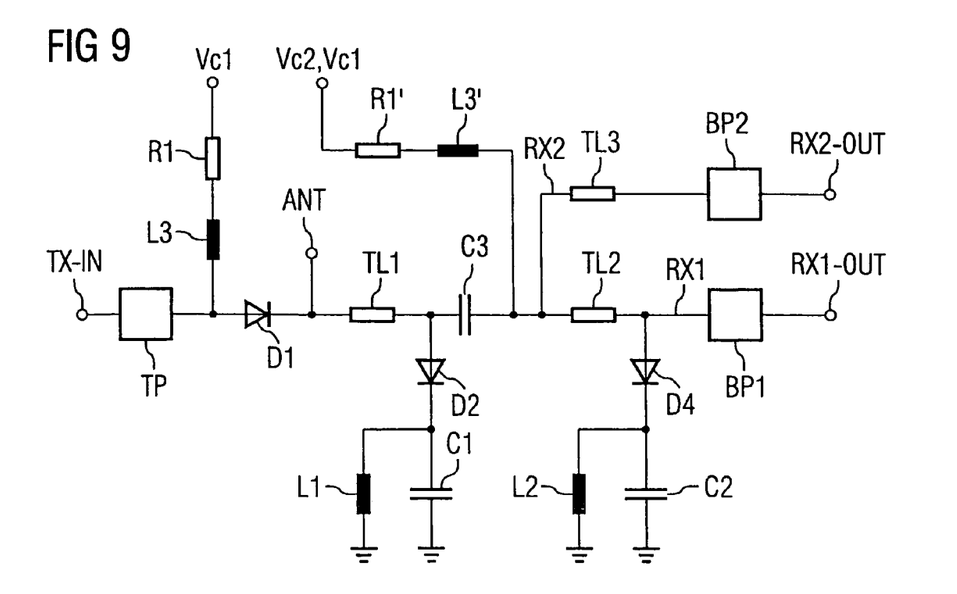
Figure 10:
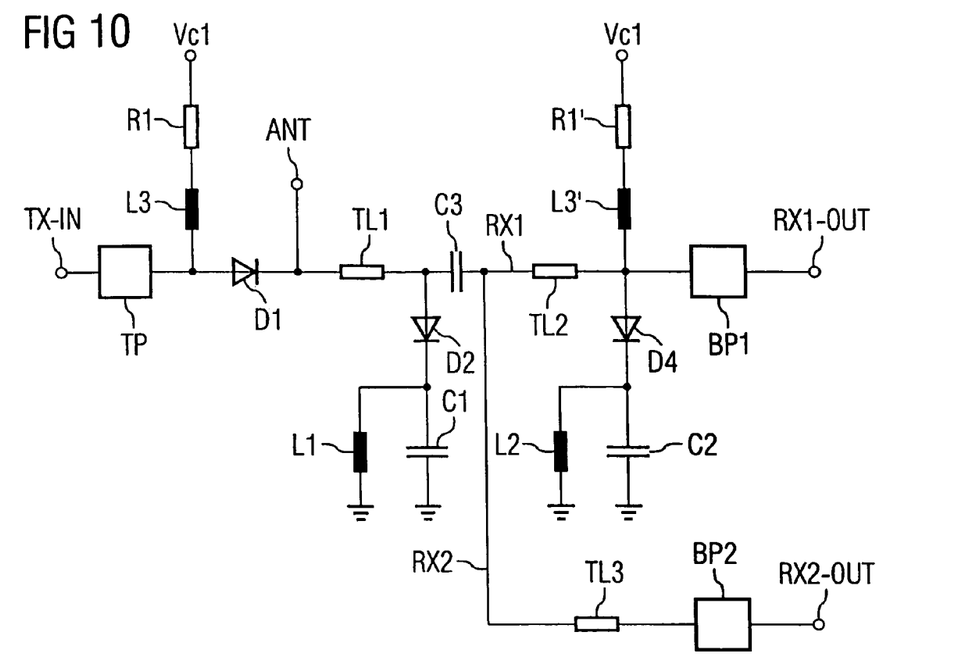

Further variants for controlling diodes D1, D2 and D4 are shown in FIGS. 8 to 10.

In FIG. 8, all diodes D1, D2 and D4 are controlled by control voltage Vc1. In this case, no switch element is present in the second partial path.

Diodes D2 and D4 can, in principle, both be closed (enabled), as suggested in FIG. 8, by means of a single control voltage Vc1. Alternatively, as suggested in FIG. 9, the diodes can each be closed (enabled) via a control voltage Vc1, Vc2 applied in a pass-through direction of the diode. It is also possible for two different control voltages Vc1, Vc2 to be simultaneously applied to a diode, e.g., to diode D4 in the first partial path in FIG. 6.

In FIG. 9, only one diode D4, to which the first or the second control voltage Vc1, Vc2 can be applied, is located in the second control path. The second control path comprises the following elements connected one behind the other: inductance L3', resistor R1', transmission line TL2, diode D4, and inductance L2. The different control paths are, in this case, separated from each other with respect to a DC signal via separation capacitor C3. In FIG. 9, a part of the first control path—formed by the connection in series of resistor R1' and inductance L3'—is connected to the signal path in front of transmission line TL2. Transmission line TL2 thus also lies in the direct current control path in this case. FIG. 10 shows that this part of the first control path (in this case R1'-L3'-D4-L2) of transmission line TL2 can be also connected on the back side.

The transmission line TL3 located in the second partial path in FIGS. 3 and 8 to 10 may be a 180° phase shifter for a signal with a frequency that is to be suppressed in this path, e.g., the pass-through frequency of filter BP1.

In one implementation, transmission line TL1 in the main path of the first signal path is a λ/4 line for a signal, i.e., for a transmitter frequency, which can be transmitted via the second signal path. Transmission line TL2 in the partial path represents a λ/4 line for a signal which is to be transmitted via the second partial (reception) path.

In FIGS. 6 to 10, inductance L1, L2, which short circuits the corresponding path (for a direct current signal) to ground via a closed (enabled) switch element, is associated with the first or the second gate circuit. Diode D2, D4 in the first or the second gate circuit and inductance L1, L2 are connected with each other and are serially connected to ground. Both capacitor C1, C2 and inductance L1, L2 are located in the (first) shunt. In the implementation shown in FIG. 11, another (second) shunt, in which an inductance is connected to ground, is located in the circuit in addition to the first shunt associated with the gate circuit. In this case, capacitor C1, C2 in the data gate (i.e. the HF absorber circuit) and inductance L1, L2 which is connected to ground (i.e. the DC absorber circuit) are located in different shunts.

Figure 11:
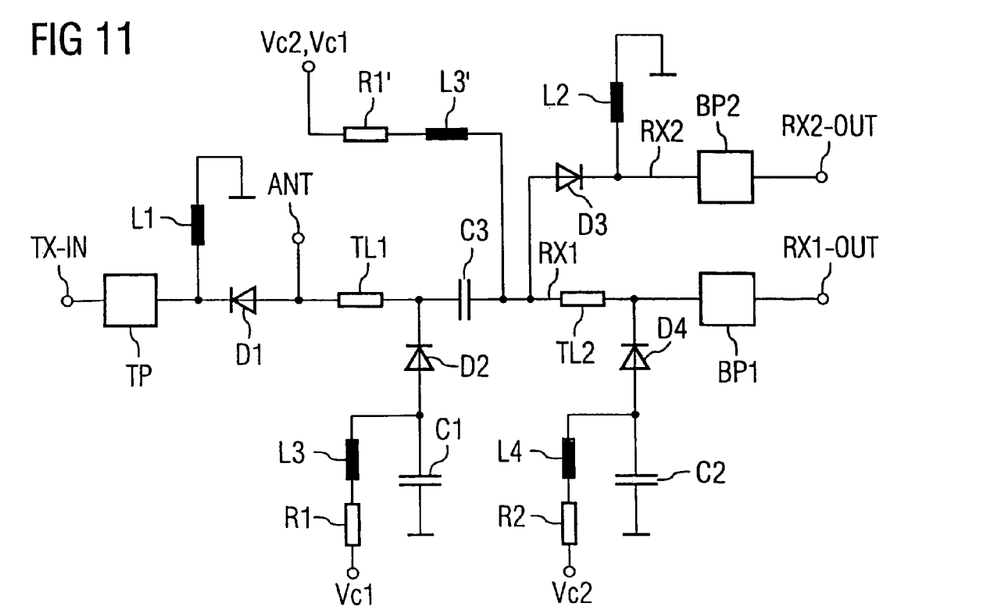
FIG. 11 shows a variant of the circuit of FIG. 7, with a gate circuit comprising two shunts.

In all embodiments described herein, it is possible to connect the diodes associated with the same control path or all diodes in the respective path in the opposite direction. FIG. 11 shows a variant of the circuit of FIG. 7, in which diodes D1 to D4 are connected in the reverse direction. The closing of the diodes still occurs in the pass-through direction of the diode and, therefore, a part of the control path (inductance L3 and resistor R1, or inductance L4 and resistor R2) is connected in the shunt between capacitor C1, C2 and diode D2, D4. Inductance L1, which is connected to ground, i.e., the first DC absorber circuit with closed (enabled) diodes, is located in another shunt, which is connected between diode D1 and the lowpass filter TP in the second signal path. Inductance L2, which is connected to ground, i.e., the second DC absorber circuit with closed diodes, is located in another shunt. This other shunt is connected to the second partial signal path between diode D3 and bandpass filter BP2.

It is also possible to configure the first control path, which includes diodes D1 and D2, as in FIG. 7 and the second control path, which includes D3 and D4, as in FIG. 11 or vice versa.

Figure 12:
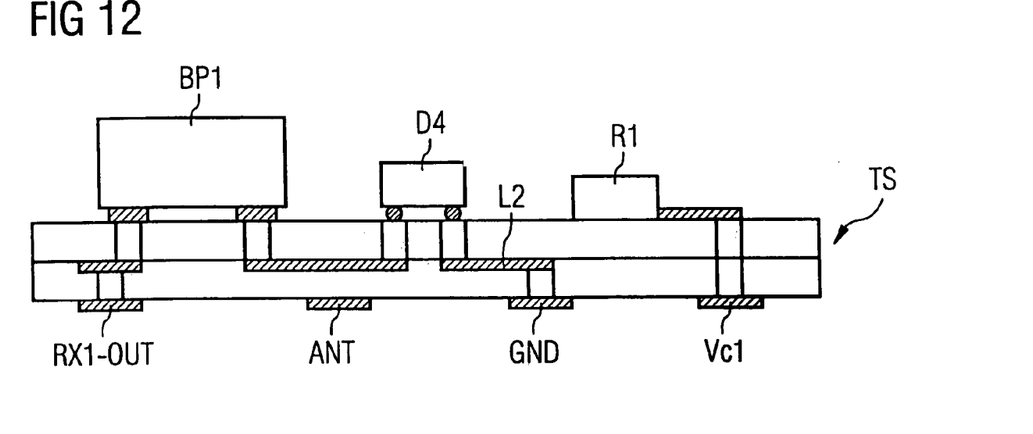
FIG. 12 shows a modular element containing the circuit.

FIG. 12 shows a schematic representation of a surface mountable element in which the circuit described herein is included. The element has a multi-layer support substrate TS with alternating dielectric and metal layers. The components of the gate circuits, e.g., transmission lines TL1, TL2 or the impedance transformers, may be formed in the—e.g., internal—metal layers. The metal layers are connected to each other, with components on the top of the substrate and with external contacts of the elements via plated-through holes. Components on the top of the substrate may be surface-mountable.

Lowpass filters TP can also be entirely formed inside the support substrate. The lowpass filters TB can alternatively be a chip, which is assembled to the top of the substrate. Bandpass filters SP1, BP2, e.g., contain structural elements operating with acoustic surface or bulk waves and are together or singly configured as a (surface mountable) chip. These chips may be mounted on the support substrate TS and are electrically connected therewith. Diodes D2, D4 may be surface mount-able discrete components, which can be located on the sup-port substrate. Resistors R1, R2 can also be assembled to the top side of the substrate as discrete components. A further possibility includes separating the resistors R to R3 as layer structures via the thick or thin layer process on the top of or in the interior layers of the support substrate TS.

The dielectric layers may be made of ceramic.

This invention is only represented by few examples, is however not limited to these or to the mentioned sample applications. Further components can be located between the circuit components that are shown. It is, e.g., possible to place further first or second gate circuits, which essentially respectively consist of an impedance transformer and a DC or a HF absorber circuit, in the first signal path in front of and/or behind the branch point. It is also possible to place an impedance matching network between the second gate circuit and the filter input. Concerning the diode direction and the activation associated therewith, various combinations of the embodiments in accordance with FIGS. 7 and 11 are possible.

What is claimed is:
1. An electrical circuit comprising:
an antenna connection for receiving a signal;
a first signal path connected to the antenna connection;
a filter arranged in the first signal path;
a first gate circuit and a second gate circuit connected in series, the first gate circuit being connected to the antenna connection, the second gate circuit being arranged between the first gate circuit and the filter;
wherein the first and second gate circuits each comprises an impedance transformer arranged in the first signal path and a shunt circuit connected to ground, the shunt circuit comprising a switch element and a capacitor, wherein when the switch element is enabled, the shunt circuit defines a ground path through which at least part of the signal can pass to ground, and, wherein the first signal path comprises a common signal path and first and second partial signal paths, the first and second partial signal paths being connected to the common signal path, the common signal path comprising the first gate circuit, and the first partial signal path comprising the second gate circuit and the filter.

2. The electrical circuit of claim 1, wherein the second partial signal path comprises at least one additional gate circuit.

3. The electrical circuit of claim 1, wherein the switch element comprises a diode or a micro-electromechanical element.

4. The electrical circuit of claim 1, wherein the shunt circuit comprises an inductive element.

5. The electrical circuit of claim 4, wherein the inductive element and the switch element are configured to absorb a DC part of the signal when the switch element is enabled.

6. The electrical circuit of claim 1, wherein the impedance transformer in the second gate circuit is arranged between the filter and the first gate circuit.

7. The electrical circuit of claim 1, wherein, in each of the first and second gate circuits, the shunt circuit is between the impedance transformer and the filter.

8. The electrical circuit of claim 1, further comprising a second signal path, the second signal path being connected to the antenna connection and comprising a filter.

9. The electrical circuit of claim 1, wherein the switch element and the capacitor in at least one of the first gate circuit and the second gate circuit are connected in a series connection, the series connection being connected to ground, the switch element comprising a first diode.

10. The electrical circuit of claim 9, wherein the electrical circuit comprises a first direct current path for providing a first control voltage to the first diode.

11. The electrical circuit of claim 10, wherein the first control voltage is applied during transmission of the signal.

12. The electrical circuit of claim 1 wherein the electrical circuit comprises a second diode and a second direct current path for providing a second control voltage to the second diode.

13. The electrical circuit of claim 12, wherein the second diode is arranged in the second partial signal path, and wherein the second control voltage is applied during transmission of the signal via the second partial signal path.

14. The electrical circuit of claim 12, wherein the electrical circuit comprises a first direct current path for providing a first control voltage to a first diode of the second gate circuit, and wherein the electrical circuit comprises a separation capacitor for separating the first and the second direct current paths.

15. The electrical circuit of claim 12, wherein the second control voltage is applied during transmission of a transmission signal in a second signal path.

16. The electrical circuit of claim 1, further comprising a first control path between a first control input and ground, the first control path comprising a series connection of a first diode and one of the impedance transformer and the switch element of the first gate circuit and an inductive element.

17. The electrical circuit of claim 16, further comprising a second control path between a second control input and ground, the second control path comprising a series connection of a second diode and one of the impedance transformer and the switch element of the second gate circuit and an inductive element.

18. The electrical circuit of claim 17, wherein the second partial signal path comprises a further filter and the second diode, and wherein the second diode is arranged between the first gate circuit and the further filter.

19. The electrical circuit of claim 16, wherein the first diode is arranged in a second signal path between the filter and the antenna connection.

20. An element comprising the circuit of claim 1, the element comprising:
a multi-layer support substrate, wherein at least some components of the first and second gate circuits are integrated, the element being surface-mountable.

21. The element of claim 20, wherein the filter is mounted on the multi-layer support substrate.

22. The electrical circuit of claim 1, wherein the filter comprises a bandpass filter.

23. An electrical circuit comprising:
an antenna connection for receiving a signal;
a first signal path connected to the antenna connection;
a filter arranged in the first signal path;
a first gate circuit and a second gate circuit connected in series, the first gate circuit being connected to the antenna connection, the second gate circuit being arranged between the first gate circuit and the filter;
wherein the first and second gate circuits each comprises an impedance transformer arranged in the first signal path and a shunt circuit connected to ground, wherein the impedance transformer comprises part of a transmission line and the shunt circuit comprises a switch element and a capacitor, and wherein when the switch element is enabled, the shunt circuit defines a ground path through which at least part of the signal can pass to ground.

24. An electrical circuit comprising:
an antenna connection for receiving a signal;
a first signal path connected to the antenna connection, wherein the electrical circuit is configured to operate with plural radio frequency bands, the first signal path comprising a common reception path for a plurality of the radio frequency bands, the first signal path further comprising a plurality of partial reception paths connected to the common reception path, each partial reception path being configured for one of the radio frequency bands;
a filter arranged in the first signal path;
a second signal path, the second signal path being connected to the antenna connection and comprising a second filter;
a first gate circuit and a second gate circuit connected in series, the first gate circuit being connected to the antenna connection, the second gate circuit being arranged between the first gate circuit and the filter;
wherein the first and second gate circuits each comprises an impedance transformer arranged in the first signal path and a shunt circuit connected to ground, the shunt circuit comprising a switch element and a capacitor, wherein when the switch element is enabled, the shunt circuit defines a ground path through which at least part of the signal can pass to ground.

25. The electrical circuit of claim 24, wherein the second signal path comprises a transmission path.

26. The electrical circuit of claim 24, wherein the filter in the second signal path comprises a lowpass filter.

27. An electrical circuit comprising:
an antenna connection for receiving a signal;
a first signal path connected to the antenna connection;
a filter arranged in the first signal path;
a first gate circuit and a second gate circuit connected in series, the first gate circuit being connected to the antenna connection, the second gate circuit being arranged between the first gate circuit and the filter;
wherein the first and second gate circuits each comprises an impedance transformer arranged in the first signal path and a shunt circuit connected to ground, the shunt circuit comprising a switch element and a capacitor, wherein when the switch element is enabled, the shunt circuit defines a ground path through which at least part of the signal can pass to ground, and wherein the impedance transformer comprises a transmission line of length $\lambda/4$, where a wavelength $\lambda$ corresponds to a frequency to be suppressed.

28. The electrical circuit of claim 27, wherein a first frequency to be suppressed in the first gate circuit corresponds to a frequency of the signal to be transmitted in a second signal path; and
wherein a second frequency to be suppressed in the second gate circuit corresponds to a frequency of the signal to be transmitted in another signal path.

29. An electrical circuit comprising:
an antenna connection for receiving a signal;
a first signal path connected to the antenna connection;
a filter arranged in the first signal path and comprising a bandpass filter;
a first gate circuit and a second gate circuit connected in series, the first gate circuit being connected to the antenna connection, the second gate circuit being arranged between the first gate circuit and the filter;
wherein the first and second gate circuits each comprises an impedance transformer arranged in the first signal path and a shunt circuit connected to ground, the shunt circuit comprising a switch element and a capacitor, wherein when the switch element is enabled, the shunt circuit defines a ground path through which at least part of the signal can pass to ground.

30. The electrical circuit of claim 29, wherein the bandpass filter comprises at least one electroacoustic component.

31. The electrical circuit of claim 30, wherein the electroacoustic component operates with acoustic surface or bulk waves.

* * * * *